(12) United States Patent
Raich

(10) Patent No.: US 10,974,757 B2
(45) Date of Patent: Apr. 13, 2021

(54) ELECTRICALLY ADJUSTABLE STEERING COLUMN FOR A MOTOR VEHICLE

(71) Applicants: THYSSENKRUPP PRESTA AG, Eschen (LI); thyssenkrupp AG, Essen (DE)

(72) Inventor: Thomas Raich, Vandans (AT)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 23 days.

(21) Appl. No.: 16/476,919

(22) PCT Filed: Jan. 16, 2018

(86) PCT No.: PCT/EP2018/050971
§ 371 (c)(1),
(2) Date: Jul. 10, 2019

(87) PCT Pub. No.: WO2018/134187
PCT Pub. Date: Jul. 26, 2018

(65) Prior Publication Data
US 2019/0329814 A1 Oct. 31, 2019

(30) Foreign Application Priority Data
Jan. 19, 2017 (DE) ...................... 10 2017 200 888.1

(51) Int. Cl.
*B62D 1/185* (2006.01)
*B62D 1/181* (2006.01)

(52) U.S. Cl.
CPC ............. *B62D 1/185* (2013.01); *B62D 1/181* (2013.01)

(58) Field of Classification Search
CPC ................................ B62D 1/185; B62D 1/181
See application file for complete search history.

(56) References Cited

U.S. PATENT DOCUMENTS

| 5,477,744 A | 12/1995 | Hoblingre |
| 7,331,608 B2 | 2/2008 | Armstrong |

(Continued)

FOREIGN PATENT DOCUMENTS

| CN | 1118752 A | 3/1996 |
| CN | 101213124 A | 7/2008 |

(Continued)

OTHER PUBLICATIONS

English Translation of International Search Report issued in PCT/EP2018/050971 dated Apr. 5, 2018.

*Primary Examiner* — Faye M Fleming
(74) *Attorney, Agent, or Firm* — thyssenkrupp North America, LLC

(57) ABSTRACT

A steering column for a motor vehicle, having a column jacket for rotatably mounting a steering shaft, and a guide part that engages around the column jacket, in which the column jacket is mounted such that it is telescopically displaceable in the direction of the rotational axis of the steering shaft by means of a motorized longitudinal adjustment drive. The steering column achieves mounting of the column jacket, which mounting is from as low-play as possible to play-free, with low structural complexity and a small installation space, by virtue of the fact that the guide part has a slot, the slot width of which can be varied by means of a clamping screw, such that a play between a bearing surface of the guide part which mounts the column jacket and an outer lateral surface of the column jacket can be set.

15 Claims, 4 Drawing Sheets

(56) References Cited

U.S. PATENT DOCUMENTS

| | | | | |
|---|---|---|---|---|
| 9,187,116 | B2 * | 11/2015 | Yokota | B62D 1/195 |
| 10,279,834 | B2 * | 5/2019 | Stinebring | B62D 1/187 |
| 10,343,708 | B2 * | 7/2019 | Forte | B62D 1/195 |
| 10,759,465 | B2 * | 9/2020 | Ganahl | B62D 1/185 |
| 2006/0266151 | A1 | 11/2006 | Avers | |
| 2009/0064814 | A1 | 3/2009 | Tanaka | |

FOREIGN PATENT DOCUMENTS

| | | |
|---|---|---|
| DE | 10 2012 222 295 A | 6/2013 |
| DE | 10 2012 104 644 B | 8/2013 |
| WO | 2013178302 A | 12/2013 |
| WO | 2015/124944 A | 8/2015 |

* cited by examiner

ELECTRICALLY ADJUSTABLE STEERING COLUMN FOR A MOTOR VEHICLE

CROSS REFERENCE TO RELATED APPLICATIONS

This application is a U.S. National Stage Entry of International Patent Application Serial Number PCT/EP2018/050971, filed Jan. 16, 2018, which claims priority to German Patent Application No. DE 10 2017 200 888.1, filed Jan. 19, 2017, the entire contents of both of which are incorporated herein by reference.

FIELD

The present disclosure generally relates to a steering column for a motor vehicle.

BACKGROUND

A steering column is known from DE 10 2012 104 644 B3. In order to avoid play between an inner column jacket which mounts the steering shaft rotatably and a guide part which mounts the column jacket in a longitudinally displaceable manner, a prestressing system is provided in the case of the known steering column, which prestressing system has a multiplicity of components, inter alia leaf springs for elastic prestress. A disadvantage of said solution is the complicated assembly and the high number of components.

Thus a need exists for an improved electrically adjustable steering column, in the case of which low-play mounting of a column jacket in a guide part is possible by way of simple means.

DETAILED DESCRIPTION

Figure 1:
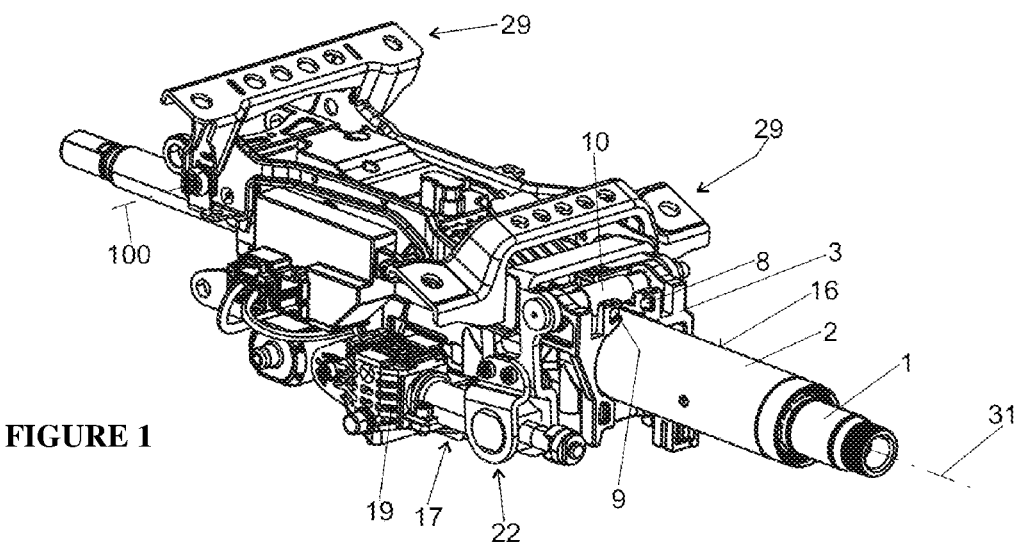
FIG. 1 is a perspective view of a steering column in the state, in which it is ready for installation.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a steering column for a motor vehicle, having a column jacket for rotatably mounting a steering shaft, and having a guide part which engages around the column jacket, in which the column jacket is mounted with its outer lateral surface in bearing surfaces of the guide part such that it is telescopically displaceable in the direction of the longitudinal axis of the steering shafts by means of a motorized longitudinal adjusting drive.

The solution according to the invention provides that the guide part has a slot, the slot width of which can be set by means of a clamping bolt to a selectable slot width, with the result that a play or a predefined prestress between the lateral surface and the mounting bearing surface of the guide part is set. The invention has the advantage that merely a slot and a clamping bolt are required, in order to reduce the play between the column jacket and the guide part to a minimum, in order to provide a clearance fit between the lateral surface of the column jacket and the bearing surface of the guide part or a predefined prestress between the column jacket and the guide part, with the result that there is an oversize fit between the lateral surface of the column jacket and the at least one bearing surface of the guide part. The displacement force which acts between the column jacket and the guide part can be set by way of the setting of the play or the predefined prestress between the column jacket and the guide part. The displacement force is to be understood to mean the friction force which is required to displace the column jacket with respect to the guide part. The stiffness and the resonant frequency of the steering column can be improved, that is to say increased, by way of the setting according to the invention of the play or the predefined prestress between the column jacket and the guide part.

The slot width can be set during the assembly of the steering column, wherein the displacement force is preferably measured during the setting of the slot width, wherein the setting of the slot width is stopped when a predefined displacement force is reached.

If the steering column also has a motorized height adjustment drive with a pivoting lever which is articulated on the guide part by means of a lever axle, it is particularly advantageous if the lever axle is formed by the clamping bolt. In this way, a lever axle which is present in any case for the height adjusting drive can be used at the same time as a clamping bolt, and an additional component can be saved in the process.

The slot is advantageously of T-shaped or L-shaped configuration. As a result, the stiffness of the guide part with respect to the forces of the clamping screw which act during tensioning of the slot is reduced, with the result that the bearing surface of the guide part can be tensioned with a lower expenditure of force. Furthermore, a T-shaped or L-shaped slot can achieve a situation where an improved, more homogeneous contact is achieved between the lateral surface and the at least one bearing surface. In this way, a fluctuation of the displacement force over the adjustment travel can be reduced.

The slot advantageously extends in the direction of the longitudinal axis of the steering column, with the result that the guide part encloses the column jacket like a clamp.

It can be provided in one advantageous development that the slot width has a constant value over the extent of the slot in a non-tensioned state of the guide part, or that the slot width has different values over the extent of the slot in a non-tensioned state of the guide part.

One advantageous refinement of the invention provides that the guide part has a plurality of bearing surfaces which protrude radially to the inside for mounting the column jacket. This measure ensures that the bearing forces or prestressing forces which act on the column jacket act at predefined points or surface regions of the outer lateral surface of the column jacket and are not distributed randomly as a consequence of deformations of the guide part during tensioning of the slot. As a result, discrete contacts between the column jacket and the guide part can be realized.

In one advantageous development, the clamping bolt is configured as a clamping screw, the clamping screw having an external thread.

A plurality of, preferably three or four, bearing surfaces are advantageously arranged at a spacing from one another in the circumferential direction. In this way, the prestressing forces (clamping forces) which act are distributed over the circumference; in the case of four bearing surfaces, two bearing surfaces are advantageously to be arranged on the right and two bearing surfaces on the left of the slot for reasons of symmetry.

Furthermore, it is advantageous that a plurality of bearing surfaces are arranged at a spacing from one another in the longitudinal direction. The column jacket can thus be secured against tilting. One embodiment is particularly advantageous, in the case of which four bearing surfaces of relatively short configuration in the axial direction are arranged offset with respect to one another in the circumferential direction in each case by 90°, and a second group of correspondingly configured bearing surfaces are arranged at an axial spacing.

It is provided in a further advantageous refinement of the invention that a sleeve is arranged on the clamping bolt, which sleeve extends transversely over the slot, and that two flanks of the guide part which lie opposite one another and delimit the slot are supported on the sleeve. If, in the case of a crash, the driver collides with the steering wheel, this can result in a radial force component which acts on the column jacket and presses the flanks of the guide part which delimit the slot apart from one another, as a result of which the slot is widened. Undesired bending apart is prevented or at least reduced by way of the support of the flanks on the sleeve of the clamping bolt.

It can be provided in one advantageous development that the guide part comprises a bore, through which the clamping bolt extends, a bush being arranged in the bore of the guide part, the bush being arranged between the bore and the clamping bolt. As a result of the bush being interconnected between the clamping bolt and the guide part, the support of the clamping bolt in the guide part can be improved. The bush is preferably configured from brass or bronze.

An electrically adjustable steering column for a motor vehicle comprises a steering shaft 1 which is mounted in a column jacket 2 such that it can be rotated about a longitudinal axis 31. The column jacket 2 for its part is mounted or held in a guide part 3 such that it can be displaced along the longitudinal axis 31. The guide part 3 is in turn mounted pivotably in a holder 39 which is connected fixedly to the vehicle chassis (not shown), as a result of which a height adjustment of the steering shaft 1 is made possible.

Figure 2:
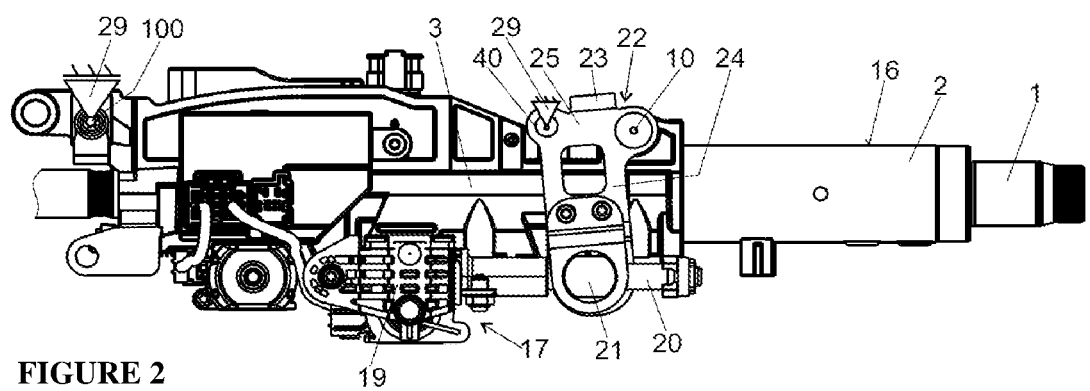
FIG. 2 is a side view of said steering column.
Figure 3:
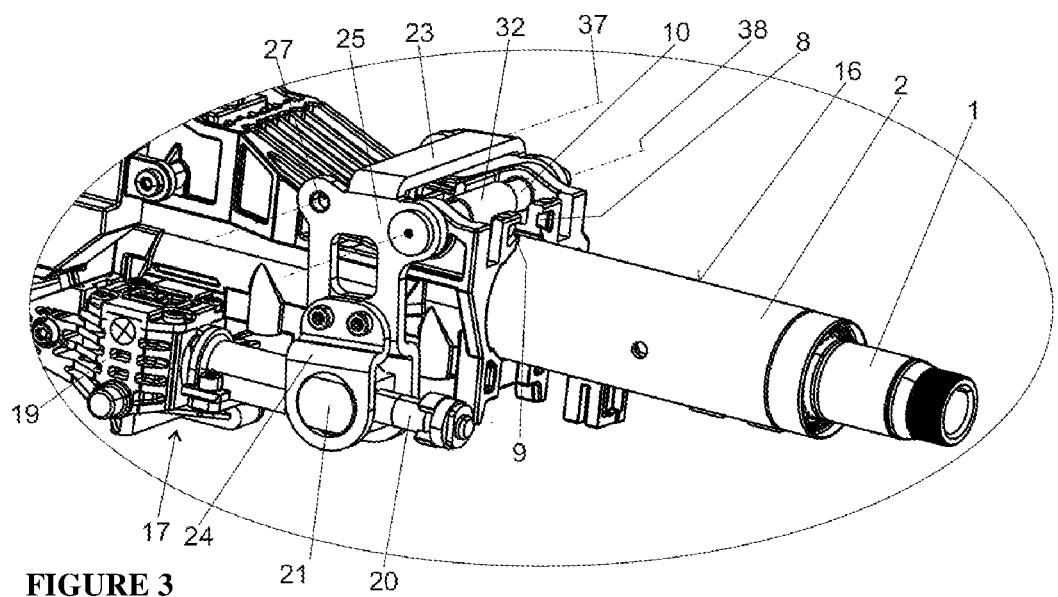
FIG. 3 is a perspective view of a detail of said steering column.
Figure 4:
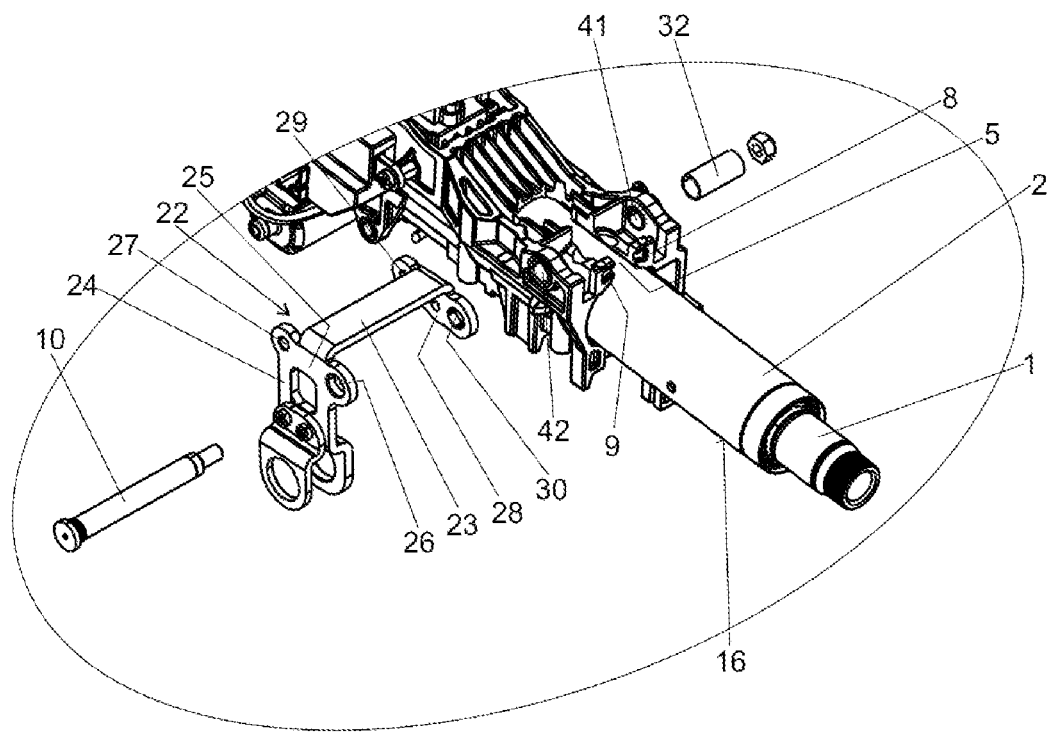
FIG. 4 is a partial view (similar to FIG. 3) of the partially dismantled steering column.
Figure 5:
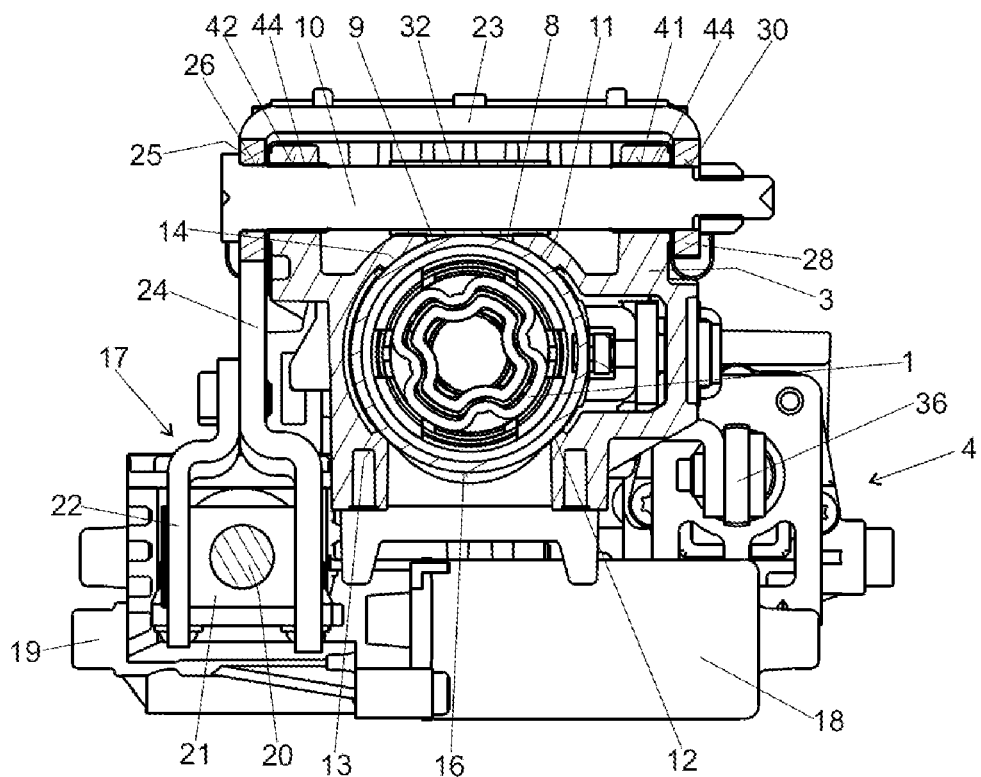
FIG. 5 is view through the clamping bolt which is sectioned transversely with respect to the longitudinal axis of the steering column.
Figure 6:
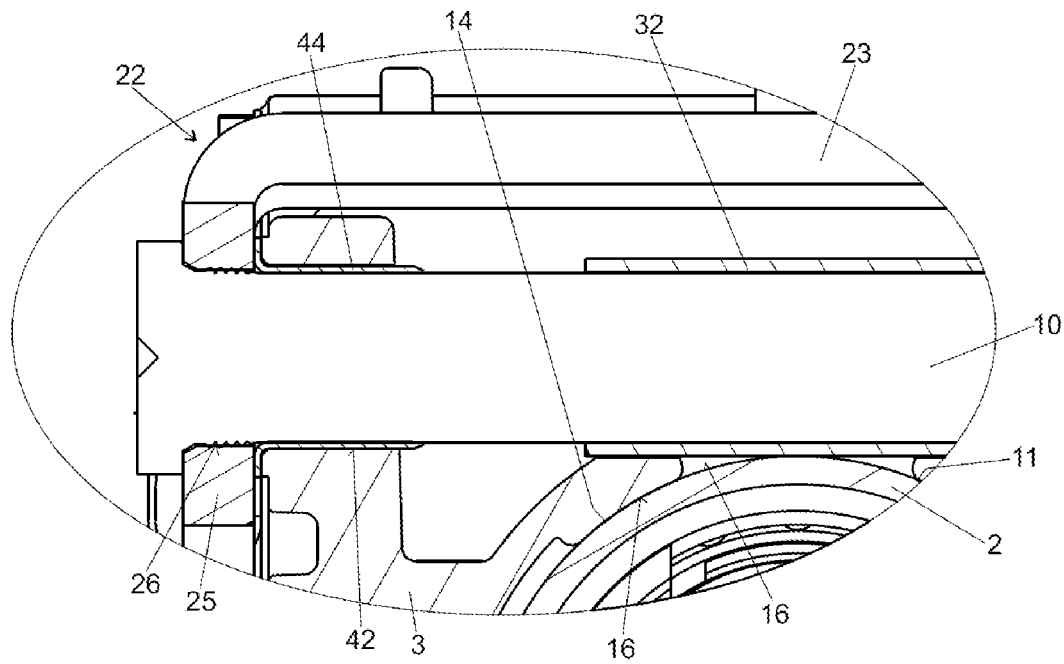
FIG. 6 is an enlarged detailed view from FIG. 5.
Figure 7:
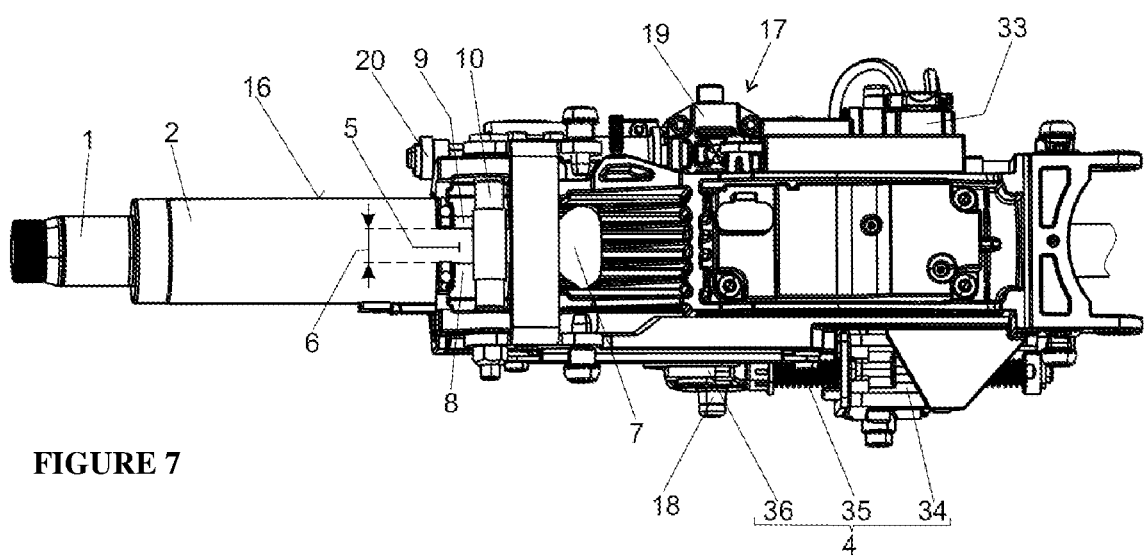
FIG. 7 is a plan view of the steering column.
Figure 8:
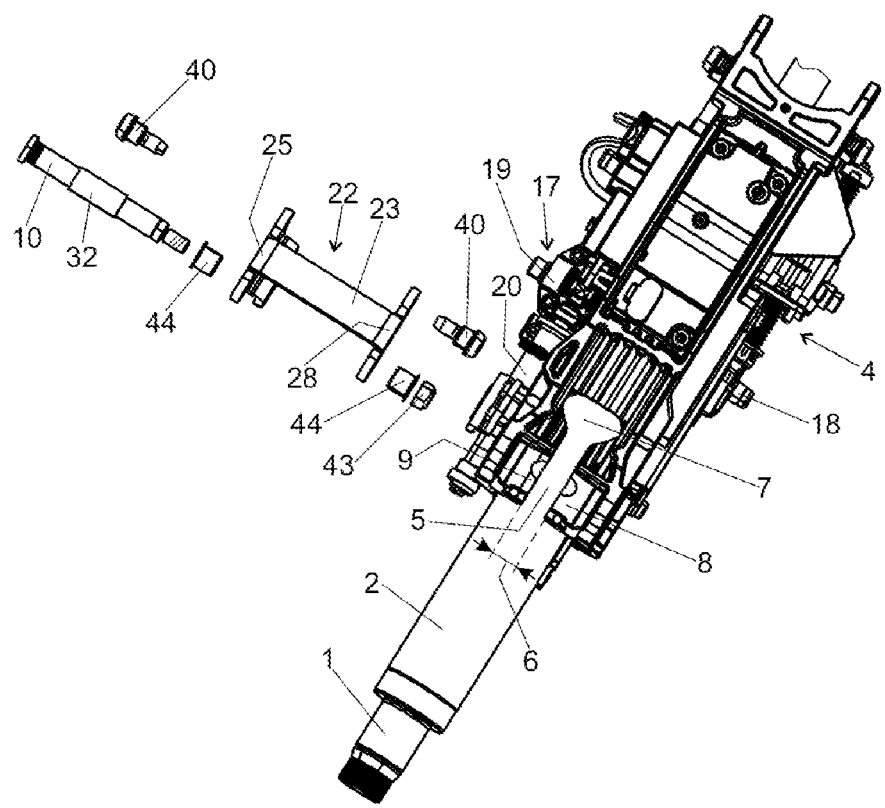
FIG. 8 is an exploded plan view (similar to FIG. 7).

An electric height adjustment drive 17 is provided for the height adjustment, which height adjustment drive 17 has an electric motor 18, a gear mechanism 19 and a spindle 20 which is arranged substantially parallel to the longitudinal axis 31 and on which a nut 21 is seated which is connected to a pivoting lever 22. In the case of actuation of the height adjustment drive 17, the rotational speed of the motor 18 is stepped down in the gear mechanism 19 which is configured as a worm gear mechanism, and the spindle 20 is driven rotationally. The nut 21 is displaced translationally on the rotating spindle 20 forward or backward in the direction of the axis of the spindle 21. The pivoting lever 22 has a connecting section 24 which is coupled to the nut 21. The connecting section 24 merges into a drive-side pivoting section 25 which is provided with two bores 26, 27 which are spaced apart from one another. The steering wheel-side bore 26 is articulated on the guide part 3 by means of a lever axle 10. The other bore 27 is articulated by means of a pin 40 on the holder 29 which is fixed to the vehicle. FIG. 2 shows a diagrammatic illustration of the holder 29, the coupling between the pivoting lever 22 and the holder being shown as a locating bearing, and the pivotable attachment about an axis 100 of the guide part 3 on the holder 29 being shown as a floating bearing. The floating bearing between the guide part 3 and the holder 29 is necessary, in order to provide a length equalization for the height adjustment, with the result that the guide part 3 can be displaced slightly in the direction of the longitudinal axis 31 with respect to the holder 29.

The drive-side pivoting section 25 of the pivoting lever 22 merges into a bridge section 23 which bridges the guide part 3 and the column jacket 2 and for its part merges into an opposite pivoting section 28 which is configured symmetrically with respect to the drive-side pivoting section 25. The opposite pivoting section 28 also has two bores 29, 30, the lever axle 10 also passing through the steering wheel-side bore 30 of the opposite pivoting section 28. The other bore 29 of the opposite pivoting section 28 is in turn articulated on the holder 39 by means of a pin 40.

If the height adjustment drive 17 displaces the nut 21 forward or backward in the direction of the longitudinal axis 31, the pivoting lever 22 pivots about a fixed pivoting axis 37 which passes through the bores 27, 29 and is fixed by means of the pins 40 on the holder 39 which is fixed to the vehicle. Since the fixed pivoting axis 37 is fixed, the movable pivoting axis 38 moves upward or downward, and, since the pivoting lever 32 is connected to the guide part 3 by means of the lever axle 10 which passes through its bores 26, 30, it pivots the guide part 3 upward or downward about the axis 100 in the process, as a result of which a height adjustment of the guide part 3 and the column jacket 2 which is mounted in the guide part 3 with the steering shaft 1 takes place.

The electric longitudinal adjustment drive 4 likewise has an electric motor 33 and a gear mechanism 34 which is connected to a spindle 35. A nut is also seated on the spindle 35, which nut is arranged within the gear mechanism 34 and is set in rotation by means of the electric motor 33, and the spindle 35 is therefore displaced translationally in the direction of the longitudinal axis 31. The spindle 35 is connected to a flange 36 which for its part is connected to the column jacket 2. If the longitudinal adjustment drive 4 is then actuated, the rotational speed of the motor 33 is stepped down in the gear mechanism 34 which is configured as a worm gear mechanism, and sets the nut in rotation. Thereupon, the spindle 35 and the flange 36 which is connected to it are displaced forward or rearward parallel to the longitudinal axis 31. Since the flange 36 is connected to the column jacket 2, it drives the column jacket 2 forward or rearward with it. As a result, a longitudinal adjustment of the column jacket 2 and the steering shaft 1 which is mounted rotatably therein is made possible.

The guide part 3 has a slot 5 which extends parallel to the longitudinal axis 31. The slot 5 has a predefined slot width 6 and a widened end region 7, with the result that the slot 5 is overall of approximately T-shaped configuration. The end region 7 serves to change the elasticity of the guide part 3 in the region of the slot 5. The slot width 6 is determined by way of two flanks 8, 9 which lie opposite one another. The slot 5 is spanned by the lever axle 10 which serves as a clamping bolt 10 which is configured as a clamping screw. The clamping screw 10 penetrates two bores 41, 42 which are arranged on the guide part 3 so as to lie opposite one another on both sides of the slot 5. Bushes 44 made from brass are inserted in the bores. The clamping screw 10 has been prestressed by means of a clamping nut 43 during the assembly of the steering column, the clamping screw 10 compressing the guide part 3 in the region of the slot 5 and reducing the slot width 6. On its inner side which faces the column jacket 2, the guide part 3 has eight bearing surfaces 11-15 which protrude radially to the inside in the direction of the column jacket 2 and serve to mount the column jacket 2.

Figure 9:
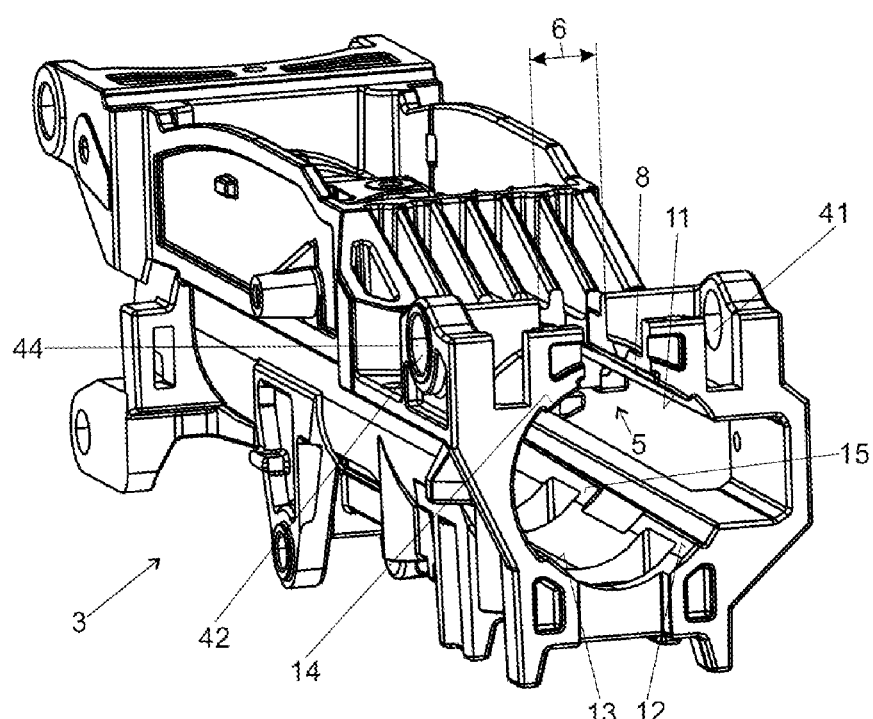
FIG. 9 is perspective view of a guide part of the steering column.

As can be best seen in FIG. 9, four bearing surfaces 11-14 are arranged in the circumferential direction in each case at spacings of approximately 90° from one another, with the result that they bear against the outer lateral surface 16 of the column jacket 2 in four regions, two bearing surfaces 11, 12 being arranged on the right hand side of the slot 5, and two other bearing surfaces 13, 14 being arranged on the left hand side of the slot 5. The four abovementioned bearing surfaces 11-14 are arranged in the steering wheel-side end region of the guide part 3. Four further bearing surfaces 15 are arranged spaced apart at an axial spacing from the steering wheel-side end region of the guide part 3, of which bearing surfaces 15 only the one bearing surface 15 is visible in FIG. 9. The bearing surface 15 and the three non-visible bearing surfaces are also distributed circumferentially at spacings of approximately 90° from one another, and in each case two bearing surfaces lie on the right hand side of the slot 5, and two other bearing surfaces lie on the left hand side of the slot 5.

The slot width 6 is dimensioned sufficiently for the assembly of the column jacket 2 in the guide part 3, with the result that the column jacket 2 is received with some play in the guide part 3. After the assembly of the column jacket 2, the clamping screw 10 is then tensioned by way of the clamping nut 43 and in the process reduces the slot width 6 until the bearing surfaces 11-15 bear without play against the outer lateral surface 16 of the column jacket 2 and a predefined displacement force is achieved between the column jacket 2 and the guide part 3. It is to be ensured here that the column jacket 2 remains displaceable in the direction of the longitudinal axis 31 with respect to the guide part 3 and the required displacement force lies within the predefined range. As an alternative, it is conceivable and possible that the clamping bolt 10 is not prestressed by means of a clamping nut 43, but rather an end region of the clamping bolt is deformed during the assembly of the steering column in order to configure a head with a greater diameter than the diameter of the shank of the clamping bolt. In this way, the clamping bolt is configured as a rivet.

A sleeve 32 is arranged on the clamping screw 10, which sleeve 32 extends transversely with respect to the longitudinal axis 31 over the slot 5 and in the process is supported on the two flanks 8, 9 of the guide part 3 which delimit the slot 5. Said support of the flanks 8, 9 on the sleeve 32 of the clamping screw 10 ensures undesired loosening of the low-play guidance between the column jacket 2 and the guide part 3 if great forces act on the steering shaft 1 and the column jacket 2 in the case of a crash, which forces act with a radial force component on the guide part 3.

The invention therefore makes seating of the column jacket 2 in the guide part 3 possible, which seating is from low-play to play-free, a lever axle 10 which is present in any case for the electric height adjustment also being used as a clamping bolt 10 which is configured as a clamping screw. As a result, not only can a separate clamping screw be dispensed with, but rather the elastic leaf springs which are used in the prior art and further guide elements which are provided for play-free mounting in the prior art can also be dispensed with. As a result, the complexity for the production of the steering column according to the invention and the installation space which is required are reduced.

LIST OF DESIGNATIONS

1 Articulated shaft
2 Column jacket
3 Guide part
4 Longitudinal adjustment drive
5 Slot
6 Slot width
7 End region
8 Flank
9 Flank
10 Clamping screw/Lever axle
11 Bearing surface
12 Bearing surface
13 Bearing surface
14 Bearing surface
15 Bearing surface
16 Lateral surface
17 Height adjustment drive
18 Motor
19 Gear mechanism
20 Spindle
21 Nut
22 Pivoting lever
23 Bridge section
24 Connecting section
25 Drive-side pivoting section
26 Bore
27 Bore
28 Opposite pivoting section
29 Bore
30 Bore
31 Longitudinal axis
32 Sleeve
33 Motor
34 Gear mechanism
35 Spindle
36 Flange
37 Fixed pivoting axis
38 Movable pivoting axis
39 Holder
40 Pin
41 Bore
42 Bore
43 Clamping nut

What is claimed is:
1. A steering column for a motor vehicle, comprising:
a steering shaft defining a longitudinal axis;

a motorized longitudinal adjustment drive;
a column jacket configured to rotatably mount the steering shaft and having an outer lateral surface;
a guide part that engages around the column jacket and having a bearing surface and a slot, wherein the column jacket is mounted by way of the outer lateral surface in the bearing surface of the guide part such that the column jacket is telescopically displaceable along the longitudinal axis by the motorized longitudinal adjustment drive;
a clamping bolt configured to adjustably set a width of the slot of the guide part to a selectable slot width, such that a play or a predefined prestressing force between the lateral surface and the mounting bearing surface of the guide part is set; and
a motorized height adjustment drive with a pivoting lever which is articulated on the guide part by a lever axle, and wherein the lever axle is formed by the clamping bolt.

2. The steering column of claim 1, wherein the slot is of T-shaped or L-shaped configuration.

3. The steering column of claim 1, wherein the slot extends in the direction of the longitudinal axis.

4. The steering column of claim 1, wherein the guide part has a plurality of bearing surfaces which protrude radially to the inside configured to mount the column jacket.

5. The steering column of claim 4, wherein three or four bearing surfaces are arranged at a spacing from one another in the circumferential direction.

6. The steering column of claim 4, wherein a plurality of bearing surfaces are arranged at a spacing from one another in the longitudinal direction.

7. The steering column of claim 1, wherein a sleeve is arranged on the clamping bolt, which sleeve extends transversely over the slot, and the two flanks of the guide part which lie opposite one another and delimit the slot are supported on the sleeve.

8. A steering column for a motor vehicle, comprising:
a steering shaft defining a longitudinal axis;
a motorized longitudinal adjustment drive;
a column jacket configured to rotatably mount the steering shaft and having an outer lateral surface;
a guide part that engages around the column jacket and having a bearing surface and a slot, wherein the column jacket is mounted by way of the outer lateral surface in the bearing surface of the guide part such that the column jacket is telescopically displaceable along the longitudinal axis by the motorized longitudinal adjustment drive, and
a clamping bolt configured to adjustably set a width of the slot of the guide part to a selectable slot width, such that a play or a predefined prestressing force between the lateral surface and the mounting bearing surface of the guide part is set,
wherein the guide part comprises a bore, through which the clamping bolt extends, a bush being arranged in the bore of the guide part, the bush being arranged between the bore and the clamping bolt.

9. The steering column of claim 8, wherein the slot is of T-shaped or L-shaped configuration.

10. The steering column of claim 8, wherein the slot extends in the direction of the longitudinal axis.

11. The steering column of claim 8, wherein the guide part has a plurality of bearing surfaces which protrude radially to the inside configured to mount the column jacket.

12. The steering column of claim 11, wherein three or four bearing surfaces are arranged at a spacing from one another in the circumferential direction.

13. The steering column of claim 11, wherein a plurality of bearing surfaces are arranged at a spacing from one another in the longitudinal direction.

14. The steering column of claim 8, wherein a sleeve is arranged on the clamping bolt, which the sleeve extends transversely over the slot, and the two flanks of the guide part which lie opposite one another and delimit the slot are supported on the sleeve.

15. The steering column of claim 8 comprising a motorized height adjustment drive with a pivoting lever which is articulated on the guide part by a lever axle, and wherein the lever axle is formed by the clamping bolt.

* * * * *